United States Patent
Kawasaki et al.

(10) Patent No.: US 10,222,287 B2
(45) Date of Patent: Mar. 5, 2019

(54) COLD CATHODE IONIZATION GAUGE AND COLD CATHODE IONIZATION GAUGE CARTRIDGE

(71) Applicant: CANON ANELVA CORPORATION, Kawasaki-shi (JP)

(72) Inventors: Yohsuke Kawasaki, Kawasaki (JP); Itaru Enomoto, Kawasaki (JP); Isao Mochizuki, Kawasaki (JP)

(73) Assignee: CANON ANELVA CORPORATION, Kawasaki-Shi (JP)

( * ) Notice: Subject to any disclaimer, the term of this patent is extended or adjusted under 35 U.S.C. 154(b) by 0 days.

(21) Appl. No.: 15/797,040

(22) Filed: Oct. 30, 2017

(65) Prior Publication Data
US 2018/0259417 A1  Sep. 13, 2018

Related U.S. Application Data

(63) Continuation of application No. PCT/JP2017/010046, filed on Mar. 13, 2017.

(51) Int. Cl.
*G01L 21/34* (2006.01)
*H01J 41/06* (2006.01)

(52) U.S. Cl.
CPC .............. *G01L 21/34* (2013.01); *H01J 41/06* (2013.01)

(58) Field of Classification Search
CPC .......... H01J 41/06; G01L 21/00; G01L 21/34; H01H 33/668; G01M 3/20
See application file for complete search history.

(56) References Cited

U.S. PATENT DOCUMENTS

| 5,157,333 A | 10/1992 | Peacock et al. |
| 5,198,772 A | 3/1993 | Peacock et al. |
| 6,474,171 B1 | 11/2002 | Holme et al. |
| 8,120,366 B2 | 2/2012 | Kawasaki |
| 8,384,391 B2 | 2/2013 | Kawasaki et al. |

(Continued)

FOREIGN PATENT DOCUMENTS

| EP | 1 039 285 B1 | 9/2000 |
| JP | 6-26967 A | 2/1994 |

(Continued)

OTHER PUBLICATIONS

International Search Report issued by JPO dated Mar. 23, 2017, in parent application No. PCT/JP2017/010046 (3 pages).

*Primary Examiner* — Jermele M Hollington
*Assistant Examiner* — Suresh K Rajaputra
(74) *Attorney, Agent, or Firm* — Venable LLP

(57) ABSTRACT

Provided are an excellent cold cathode ionization gauge and an excellent cold cathode ionization gauge cartridge. The cold cathode ionization gauge includes: an anode; a cathode, which has a tubular shape, and is arranged to surround the anode; a seal for sealing one opening of the cathode; a first member, which faces the seal inside the cathode, and has a through hole formed therein; a partition for partitioning a space surrounded by the cathode, the seal, and the first member into a first space that the first member faces and a second space that the seal faces; and a light source, which is arranged in the partition or the second space, and is configured to emit an electromagnetic wave, in which a gap is formed between at least part of an outer peripheral portion of the partition and the cathode.

17 Claims, 14 Drawing Sheets

(56) References Cited

U.S. PATENT DOCUMENTS

| | | | |
|---|---|---|---|
| 9,316,555 B2 | 4/2016 | Enomoto et al. | |
| 2010/0259273 A1 | 10/2010 | Kawasaki et al. | |
| 2014/0368210 A1* | 12/2014 | Enomoto | G01L 21/34 |
| | | | 324/460 |

FOREIGN PATENT DOCUMENTS

| | | |
|---|---|---|
| JP | 9-5198 A | 1/1997 |
| JP | 4836306 B2 | 10/2011 |

* cited by examiner

COLD CATHODE IONIZATION GAUGE AND COLD CATHODE IONIZATION GAUGE CARTRIDGE

CROSS-REFERENCES TO RELATED APPLICATIONS

This application is a continuation application of International Application No. PCT/JP2017/010046, filed Mar. 13, 2017. The contents of the aforementioned applications are incorporated herein by reference in their entireties.

BACKGROUND OF THE INVENTION

Field of the Invention

The present invention relates to a cold cathode ionization gauge and a cold cathode ionization gauge cartridge.

Cold cathode ionization gauges are configured to measure pressure by applying high voltage between a cathode and an anode provided in a discharge space in a gauge head container to cause self-discharging so that gas is ionized. Discharging is not caused as soon as voltage is applied between the anode and the cathode, and hence it is preferred to prompt the start of discharging. For example, in Japanese Patent Application Laid-Open No. 06-26967, a glow lamp is provided and a cathode is irradiated with electromagnetic waves, specifically, electromagnetic radiation so that the cathode generates electrons with a photoelectric effect. In this way, discharging is induced.

SUMMARY OF THE INVENTION

According to one embodiment of the present invention, there is provided a cold cathode ionization gauge, including: an anode; a cathode, which has a tubular shape, and is arranged to surround the anode; a seal for sealing one opening of the cathode; a first member, which faces the seal inside the cathode, and has a through hole formed therein; a partition for partitioning a space surrounded by the cathode, the seal, and the first member into a first space that the first member faces and a second space that the seal faces; and a light source, which is arranged in the partition or the second space, and is configured to emit an electromagnetic wave, in which a gap is formed between at least part of an outer peripheral portion of the partition and the cathode.

According to another embodiment of the present invention, there is provided a cold cathode ionization gauge cartridge, which is removably arranged inside a cathode of a cold cathode ionization gauge, the cold cathode ionization gauge including: an anode; the cathode, which has a tubular shape, and is arranged to surround the anode; and a seal for sealing one opening of the cathode, the cold cathode ionization gauge cartridge including: a first member, which faces the seal, and has a through hole formed therein; a partition for partitioning a space surrounded by the cathode, the seal, and the first member into a first space that the first member faces and a second space that the seal faces; and a connection portion, which has a tubular shape, for connecting the first member and the partition to each other, in which a gap is formed between the connection portion and the partition.

According to yet another embodiment of the present invention, there is provided a cold cathode ionization gauge, including: an anode; a cathode, which has a tubular shape, and is arranged to surround the anode; a first magnetic member, which has a disc shape and a through hole through which the anode passes inside the cathode; and a second magnetic member, which has a disc shape, and is arranged to face the first magnetic member inside the cathode, in which at least one of the first magnetic member or the second magnetic member has a larger thickness at a center portion thereof than at an outer peripheral portion thereof.

According to still another embodiment of the present invention, there is provided a cold cathode ionization gauge cartridge, which is removably arranged inside a cathode of a cold cathode ionization gauge, the cold cathode ionization gauge including: an anode; and the cathode, which has a tubular shape, and is arranged to surround the anode, the cold cathode ionization gauge cartridge including: a first magnetic member, which has a disc shape and a through hole through which the anode passes inside the cathode; and a second magnetic member, which has a disc shape, and is arranged to face the first magnetic member inside the cathode, in which at least one of the first magnetic member or the second magnetic member has a larger thickness at a center portion thereof than at an outer peripheral portion thereof.

DESCRIPTION OF THE EMBODIMENTS

First Embodiment

Figure 1:
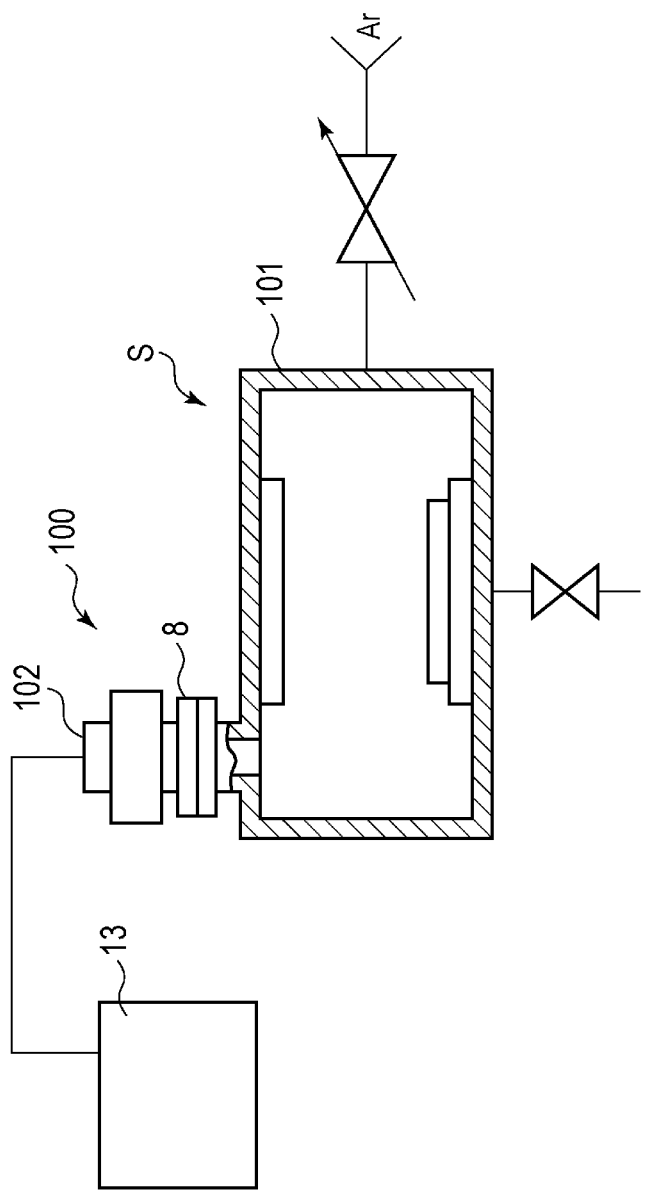
FIG. 1 is a schematic view for illustrating a vacuum processing apparatus according to a first embodiment of the present invention.

A cold cathode ionization gauge and a cold cathode ionization gauge cartridge according to a first embodiment of the present invention are described with reference to the drawings. FIG. 1 is a schematic view for illustrating a vacuum processing apparatus according to the first embodiment. FIG. 1 is an illustration in which a cold cathode ionization gauge 100 according to the first embodiment is mounted on a vacuum processing apparatus S. The vacuum processing apparatus S is a film forming apparatus, for example. Examples of the film forming apparatus include a sputtering apparatus, a PVD apparatus, and a CVD apparatus. Further, the vacuum processing apparatus S may be a surface treatment apparatus, for example, an asking apparatus or a dry etching apparatus.

As illustrated in FIG. 1, the cold cathode ionization gauge 100 includes a gauge head 102, and a cold cathode ionization gauge control unit (vacuum gauge operation circuit) 13 connected to the gauge head 102. The vacuum processing apparatus S includes a vacuum container 101. The gauge head 102 is mounted at an opening portion in the wall surface of the vacuum container 101 in an airtight manner. Specifically, the gauge head 102 is connected to the vacuum container 101 by a flange 8. The cold cathode ionization gauge control unit 13 and the gauge head 102 may be provided separately or integrally.

Figure 2:
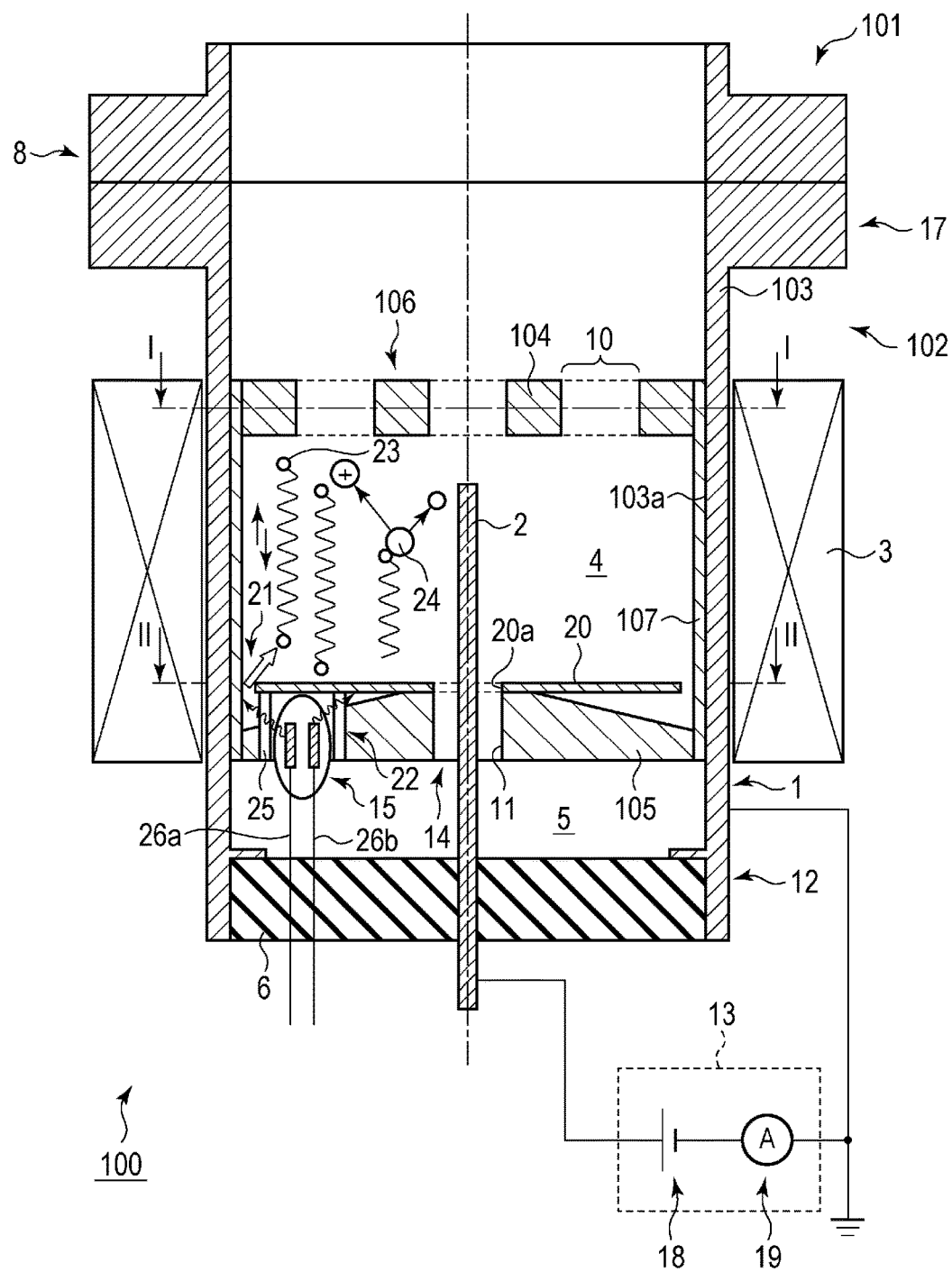
FIG. 2 is a cross-sectional view for illustrating a cold cathode ionization gauge according to the first embodiment.

FIG. 2 is a cross-sectional view for illustrating the cold cathode ionization gauge 100 according to the first embodiment. The cold cathode ionization gauge 100 is, for example, an inverted magnetron gauge, but is not limited thereto. The gauge head 102 includes a gauge head container (container, casing) 103 making up a cathode 1, and an anode 2. The gauge head container 103 making up the cathode 1 is formed into a substantially cylindrical shape (substantially tubular shape). The anode 2 is formed into a rod-like shape. The substantially cylindrical cathode 1 is positioned to surround the rod-like anode 2. The anode 2 and the cathode 1 form a discharge space 4. The gauge head container 103 is made of metal, for example. As the material of the gauge head container 103, stainless steel is used, for example. The anode 2 is made of metal, for example.

A ring-like magnet (magnetic means) 3 for forming a magnetic field surrounds the gauge head container 103. As the magnet 3, a permanent magnet, for example, a ferrite magnet is suitably used.

At one end portion 12 of the gauge head container 103, an insulating member 6 is mounted. The insulating member 6 seals the one end portion (seal) 12 of the gauge head container 103. The anode 2 passes through the insulating member 6 while being fixed thereto in an airtight manner. As the material of the insulating member 6, alumina ceramic is used, for example. The other end portion 17 of the gauge head container 103 is open, and is connected to the vacuum container 101.

In the gauge head container 103, a replaceable gauge head cartridge 106 is arranged. The gauge head cartridge 106 includes pole pieces (members) 104 and 105 for adjusting a magnetic field, which surround the discharge space 4, a wall portion 107 that is formed into a shape along a wall portion 103a of the gauge head container 103 and surrounds the discharge space 4, a plate-like body 20, and a light source cover 25 arranged in a partition. Such a replaceable gauge head cartridge 106 is arranged in the gauge head container 103 because the cathode portion is deteriorated by ions that collide therewith, and cathode constituent particles generated through sputtering in the discharge space 4 adhere to the cover 25 covering a light source 15.

Figure 3A:
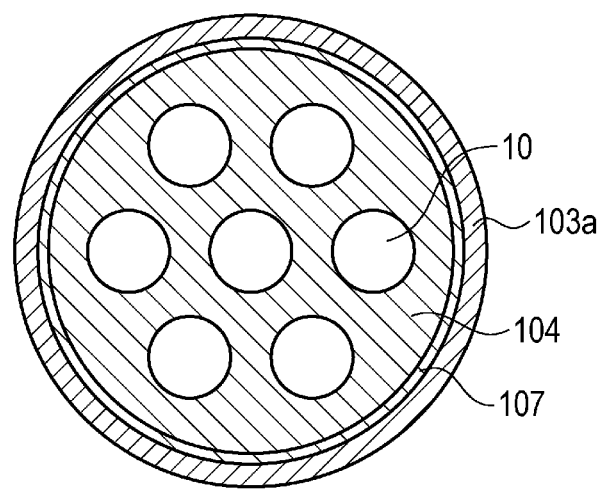
FIGS. 3A and 3B are cross-sectional views for illustrating a gauge head of the cold cathode ionization gauge according to the first embodiment.

The pole piece (first member) 104 is fixed to one end of the tubular wall portion (connection portion) 107. The pole piece 104 is positioned between the other end portion 17 of the gauge head container 103 and the pole piece (second member) 105. The pole piece 104 may be made of a magnetic material or a non-magnetic material. When a non-magnetic material is used as the material of the pole piece 104, magnetic lines of force bend with respect to the wall surface of the gauge head container 103. When a magnetic material is used as the material of the pole piece 104, however, the magnetic lines of force are parallel to the wall surface of the gauge head container 103. It is accordingly preferred to use a magnetic material as the material of the pole piece 104 in terms of preventing electrons from being biased in the gauge head container 103. The examples of the material of the pole piece 104 include magnetic stainless steel and non-magnetic stainless steel. The pole piece 104 makes up the cathode 1 together with the gauge head container 103. FIG. 3 are cross-sectional views for illustrating the gauge head 102. FIG. 3A corresponds to a cross section taken along the line I-I of FIG. 2. As illustrated in FIG. 3A, the pole piece 104 has a plurality of openings (opening portions) 10 formed therein. Gas is exchangeable between the gauge head 102 and the vacuum container 101 through the openings 10.

Figure 3B:
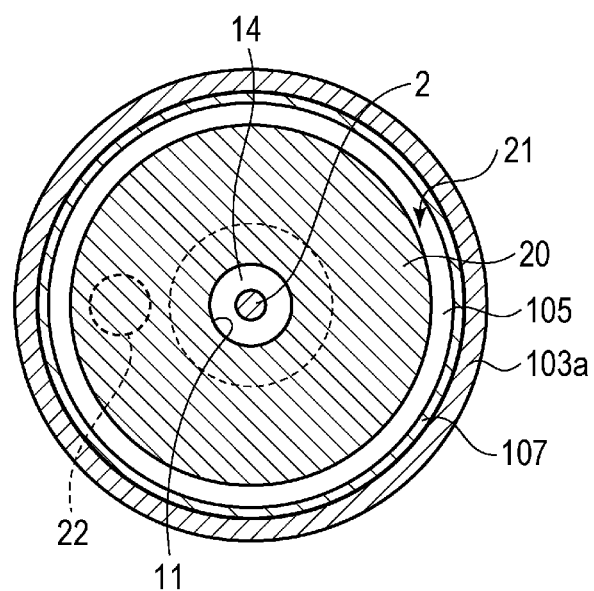

The pole piece 105 is fixed to the other end of the tubular wall portion 107. The pole piece 105 is positioned between the one end portion (seal) 12 of the gauge head container 103 and the pole piece 104. The pole piece 105 makes up the partition together with the plate-like body (third member) 20, which is described later. Similarly to the pole piece 104, the pole piece 105 may be made of a magnetic material or a non-magnetic material. Similarly to the material of the pole piece 104, the examples of the material of the pole piece 105 include magnetic stainless steel and non-magnetic stainless steel. The pole piece 105 makes up the cathode 1 together with the gauge head container 103, the pole piece 104, and other components. FIG. 3B corresponds to a cross section taken along the line II-II of FIG. 2. As illustrated in FIG. 3B, a through hole 11 is formed in the center portion of the pole piece 105. The rod-like anode 2 passes through the through hole 11. A gap 14 is formed between the anode 2 and the inner surface of the through hole 11.

The wall portion 107 is formed into a shape along the wall portion 103a of the gauge head container 103. That is, the wall portion 107 is formed into a substantially cylindrical shape. Similarly to the pole piece 104 and the pole piece 105, the wall portion 107 may be made of a magnetic material or a non-magnetic material. Similarly to the pole piece 104 and the pole piece 105, the examples of the material of the wall portion 107 include magnetic stainless steel and non-magnetic stainless steel. The wall portion 107 makes up the cathode 1 together with the gauge head container 103, the pole pieces 104 and 105, and other components.

As described above, the gauge head container 103, the pole piece 104, the pole piece 105, and the wall portion 107 make up the cathode 1. The anode 2 is positioned in the discharge space 4 surrounded by the pole piece 104, the pole piece 105, and the wall portion 107, that is, in the discharge space 4 surrounded by the gauge head cartridge 106.

Seen from another point of view, the discharge space 4 formed by the anode 2 and the cathode is partitioned by the pole piece 105 and the pole piece 104. Seen from still another point of view, the pole piece 105 and the plate-like body 20, which make up the partition, partition a space surrounded by the cathode 1, the seal 12, and the pole piece 104 into the discharge space (first space) 4 that the pole piece 104 faces and a space (second space) 5 that the seal 12 faces.

The pole piece 105 has formed therein a light source arrangement portion (light source installation portion, light source insertion portion, light source mounting portion) 22 into which the light source 15 is inserted. The light source 15 emits electromagnetic waves, for example, soft X-rays. The light source arrangement portion 22 is a through hole formed in the pole piece 105, for example. The light source 15 is arranged in the light source arrangement portion 22. The cover 25 may be provided to the light source arrangement portion 22. The light source arrangement portion 22 is positioned near the wall portion 107. A distance between the light source arrangement portion 22 and the wall portion 107 is shorter than a distance between the light source arrangement portion 22 and the anode 2. That is, the light source 15 is positioned near the wall portion 107. In addition, a distance between the light source 15 and the wall portion 107 is shorter than a distance between the light source 15 and the anode 2. Due to the configuration in which the light source 15 is arranged near the wall portion 107, electromagnetic waves emitted from the light source 15 reach the wall portion 107 without large energy attenuation. Thus, electrons (photoelectrons) are easily emitted from the wall portion 107 into the discharge space 4 by a photoelectric effect. The wall portion 107 is a portion that is the farthest from the anode 2 among the components of the cathode 1. Thus, when electrons are emitted from the wall portion 107 by a large amount, electrons that travel a long distance to the anode 2 are supplied to the discharge space 4 by a large amount. When the electrons that travel a long distance to the anode 2 are supplied to the discharge space 4 by a large amount, the probability of collision between electrons 23 and gas molecules 24 is high, which means that time until the start of discharging can be shortened.

The plate-like body (member, plate-like member) 20 is mounted on the discharge space 4 side of the pole piece 105. A through hole 20a is formed in the center portion of the plate-like body 20. The plate-like body 20 is fixed to the pole piece 105 in the center portion of the pole piece 105. The plate-like body 20 is formed into a disc shape, for example. A gap 21 is formed between at least part of the outer peripheral portion of the plate-like body 20 and the wall portion 107. Light beams emitted from the light source 15, namely, electromagnetic waves are radiated on the wall portion 107 forming the gap 21. Alternatively, the electromagnetic waves may be introduced into the discharge space 4 through the gap 21. Electrons emitted from the wall portion 107 may also be introduced into the discharge space 4 through the gap 21. The light source 15 is arranged between the plate-like body 20 and the pole piece 105. The light source 15 is arranged so that the light source 15 is not directly seen from the discharge space 4. However, as long as the light source is arranged so that at least part of the light source is not directly seen from the discharge space 4, another part of the light source 15 may project into the discharge space 4 for positioning or other purposes. The light source 15 is arranged in the pole piece 105, which makes up the partition, at a location outside the discharge space 4. In the first embodiment, the plate-like body 20 is arranged to cover the light source 15, and hence the light source 15 is not directly seen from the discharge space 4. The first embodiment employs the configuration, in which the light source 15 is arranged so that the light source 15 is not directly seen from the discharge space 4, to prevent cathode constituent particles generated through sputtering in the discharge space 4 from adhering to the light source 15. The adhesion of the cathode constituent particles to the light source 15 may be prevented, and hence the light source 15 can emit electromagnetic waves to its outside for a long period. As a result, according to the first embodiment, the life of the gauge head 102 can be increased.

The pole piece 105 has an inclined surface on the discharge space 4 side. In other words, a distance between the pole piece 105 and the plate-like body 20 in the outer peripheral portion of the pole piece 105 is larger than a distance between the pole piece 105 and the plate-like body 20 in the center portion of the pole piece 105. The thickness of the center portion of the pole piece 105 is larger than the thickness of the outer peripheral portion of the pole piece 105. The pole piece 105 has the inclined surface on the discharge space 4 side so that electromagnetic waves emitted from the light source 15 sufficiently reach the wall portion 107.

At least part of the light source 15 is covered with the cover 25. More specifically, the light source 15 is covered with the cover 25 having a cylindrical shape, for example. The cover 25 is a quartz tube, for example. In the first embodiment, the light source 15 is covered with the cover 25 because of the following reasons. Electrodes 26a and 26b led from the light source 15 are fixed to electrodes (not shown) provided to the insulating member 6 by welding, for example. This means that, when cathode constituent particles generated through sputtering in the discharge space 4 adhere to the light source 15 itself, and the light source 15 no longer emits sufficient electromagnetic waves to the outside, the insulating member 6 and other components also need to be replaced. In contrast to this, in the first embodiment, the light source 15 is covered with the cover 25, and hence cathode constituent particles generated through sputtering in the discharge space 4 may adhere to the cover 25 but hardly adhere to the light source 15. When cathode constituent particles generated through sputtering in the discharge space 4 adhere to the cover 25, only the gauge head cartridge 106 including the cover 25 needs to be replaced. The first embodiment can therefore contribute to a reduction in maintenance cost. Due to the reasons described above, the light source 15 is covered with the cover 25 in the first embodiment.

At least one of the light source 15 or the cover 25 may be coated with a material having a low work function, specifically, a metal film. When electromagnetic waves enter a material having a low work function, electrons are generated more efficiently. Thus, when the light source 15, the cover 25, or another component is coated with a material having a low work function, electrons can be generated efficiently. Further, the inner surface of the wall portion 107 may be coated with a material having a lower work function than the material of the wall portion 107. Also in this case, electrons can be generated efficiently at a portion coated with the material.

The anode 2 passes through the insulating member 6 while being fixed thereto in an airtight manner. The anode 2 is electrically connected to the cold cathode ionization gauge control unit 13. The cold cathode ionization gauge control unit 13 includes a power supply 18 configured to apply voltage to the anode 2, and a discharge current detection portion 19 configured to measure discharge current that flows to the anode 2.

In the first embodiment, the light source 15 is not arranged on the pole piece 104 side but is arranged on the pole piece 105 side, and hence the light source 15 and the anode 2 may be supplied with electric power from the same side. Due to this configuration, a terminal for supplying electric power to the light source 15 can be provided in an airtight manner to the insulating member through which the anode passes in an airtight manner. In the first embodiment, it is not necessary to arrange the insulating member provided with the terminal for supplying electric power to the anode and the insulating member provided with the terminal for supplying power to the light source in separate places. Accordingly, the first embodiment can contribute to simplification of the structure, a reduction in cost, and the like.

As described above, the thickness of the center portion of the pole piece 105 is larger than the thickness of the outer peripheral portion of the pole piece 105. In the first embodiment, the pole piece 105 having the larger thickness in the center portion than in the outer peripheral portion has not only the purpose as described above, but also the following purpose. Specifically, the pole piece 105 has the through hole 11. When the pole piece 105 has the through hole 11 in the center portion, a magnetic flux density in the center portion of the discharge space 4 is relatively small in general. In contrast to this, when the pole piece 105 is given the larger thickness in the center portion than in the outer peripheral portion, the magnetic flux density in the center portion of the discharge space 4 can be increased. Under a high vacuum state, the absolute number of electrons is small, and the electrons, which are small in absolute number, concentrate on the vicinity of the anode 2, that is, the center portion of the discharge space 4. Thus, an increase in magnetic flux density in the center portion of the discharge space 4 prompts discharging, to thereby contribute to a reduction in discharge start time and the like. In this way, the pole piece 105 that is given the larger thickness in the center portion than in the outer peripheral portion may also contribute to a reduction in discharge start time and the like.

As described above, the pole piece 105 has the inclined surface on the discharge space 4 side. That is, the thickness of the pole piece 105 gradually increases from the outer peripheral portion to the center portion. In other words, in the first embodiment, the thickness of the pole piece 105 continuously changes. The pole piece 105 having the thickness that gradually increases from the outer peripheral portion to the center portion may contribute to an improvement in IP characteristics (pressure-discharge current characteristics) and reproducibility.

A part of the gauge head 102 can be removed from the gauge head 102 for replacement. This part is referred to as "cold cathode ionization gauge cartridge". The pole pieces 104 and 105, the plate-like body 20, and the cover 25 may be included in the gauge head cartridge 106, namely, the cold cathode ionization gauge cartridge.

(Evaluation Results)

Figure 4:
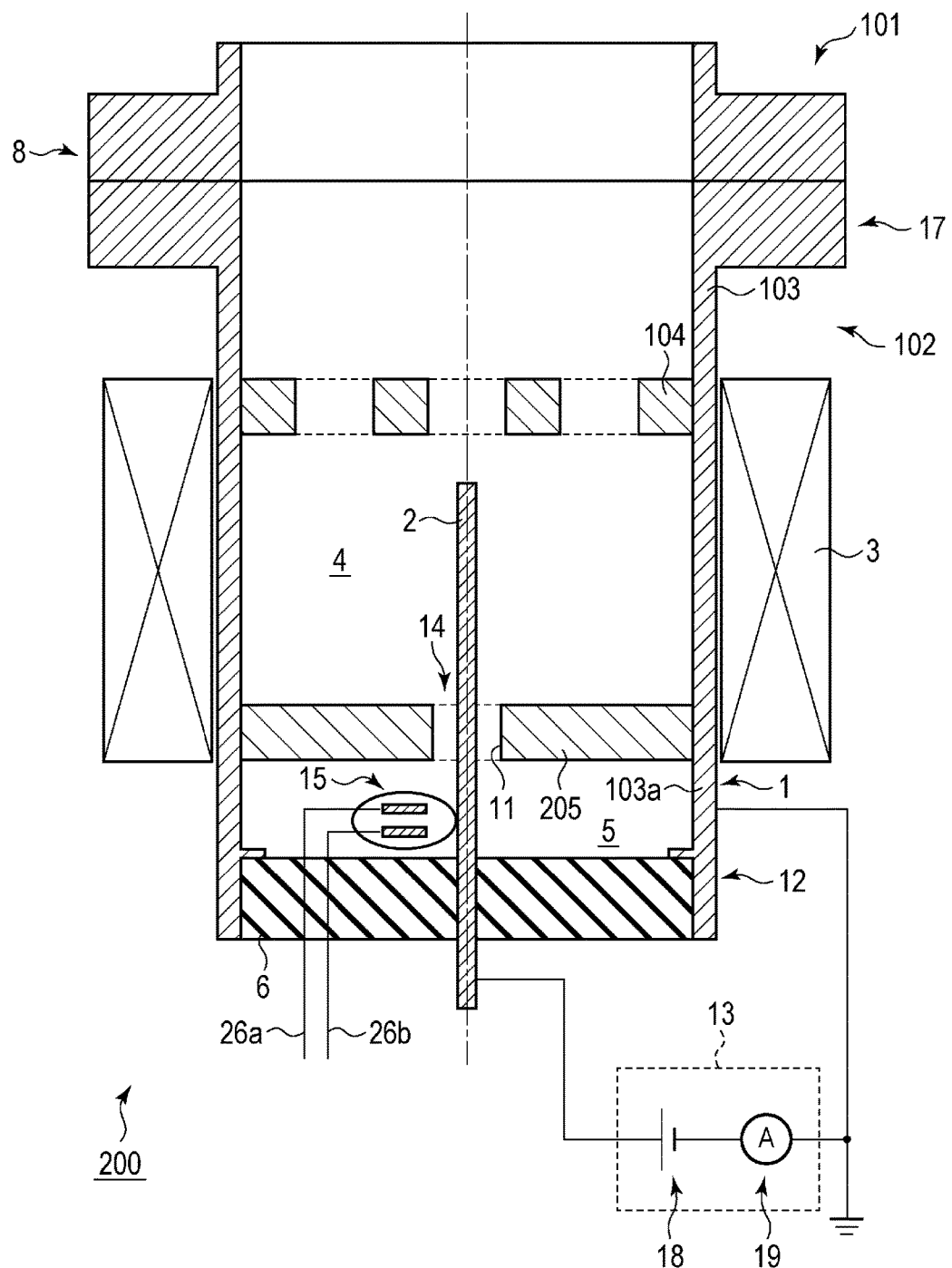
FIG. 4 is a cross-sectional view for illustrating a cold cathode ionization gauge according to a comparative example.

The evaluation results of the cold cathode ionization gauge 100 according to the first embodiment are described with reference to the drawings. FIG. 4 is a cross-sectional view for illustrating a cold cathode ionization gauge 200 according to a comparative example. In the cold cathode ionization gauge 200 according to the comparative example, a light source 15 is arranged between a pole piece 205 and an insulating member 6, and the light source 15 is positioned near an anode 2. Further, the pole piece 205 has a uniform thickness in the cold cathode ionization gauge 200 according to the comparative example.

Figure 5:
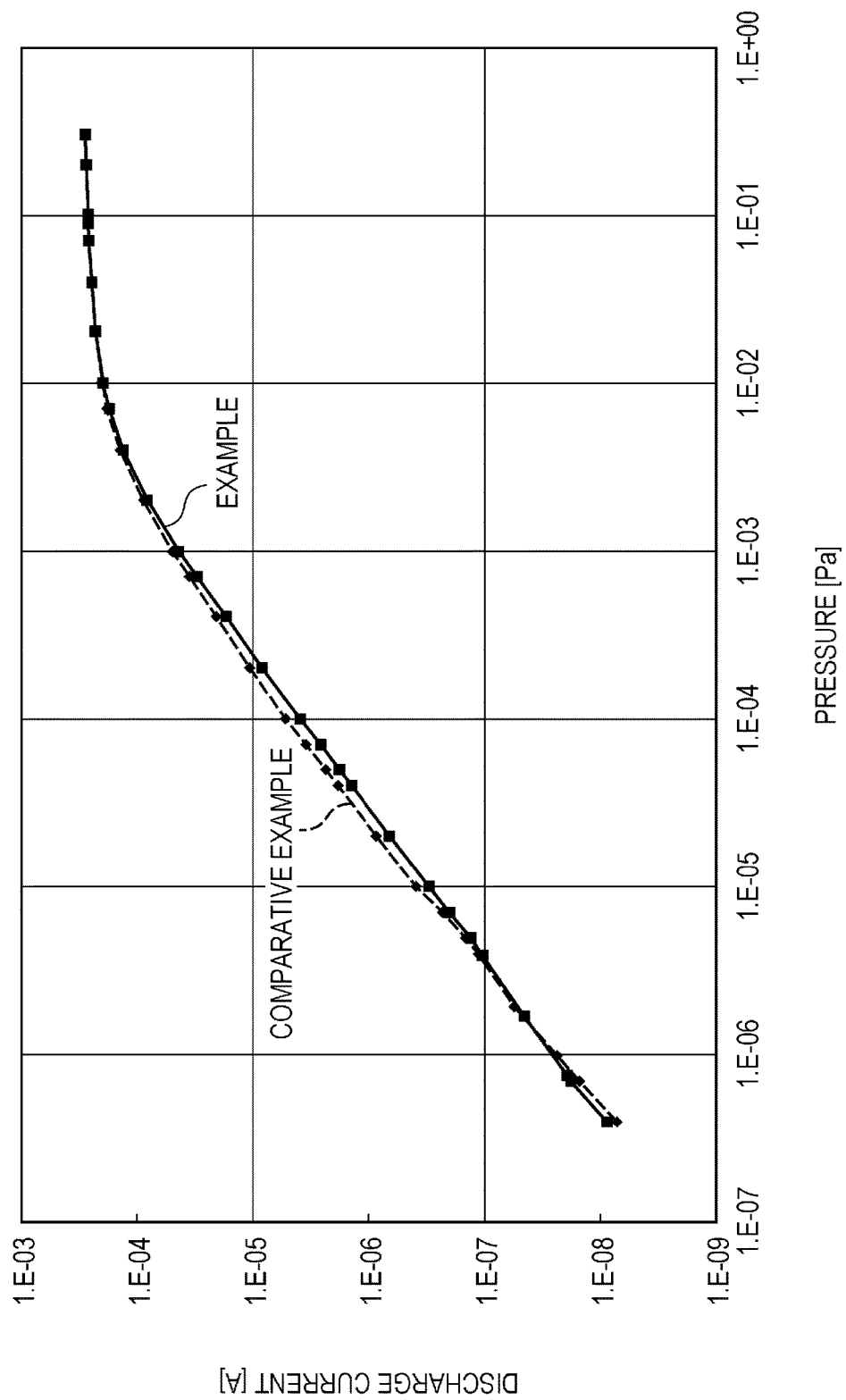
FIG. 5 is a graph for showing pressure-discharge current characteristics.

FIG. 5 is a graph for showing the I-P characteristics, that is, the pressure-discharge current characteristics of the cold cathode ionization gauge 100 according to an example of the present invention, namely, the first embodiment and the cold cathode ionization gauge 200 according to the comparative example. The horizontal axis represents pressure, and the vertical axis represents discharge current. As can be seen in FIG. 5, sufficiently linear characteristics are not always obtained in the cold cathode ionization gauge 200 according to the comparative example. In contrast to this, in the case of the cold cathode ionization gauge 100 according to the first embodiment, sufficiently linear characteristics are obtained over a wide pressure range. From the foregoing, it is found that, according to the first embodiment, the cold cathode ionization gauge 100 capable of performing measurement with high accuracy over a wide pressure range may be provided.

Figure 6:
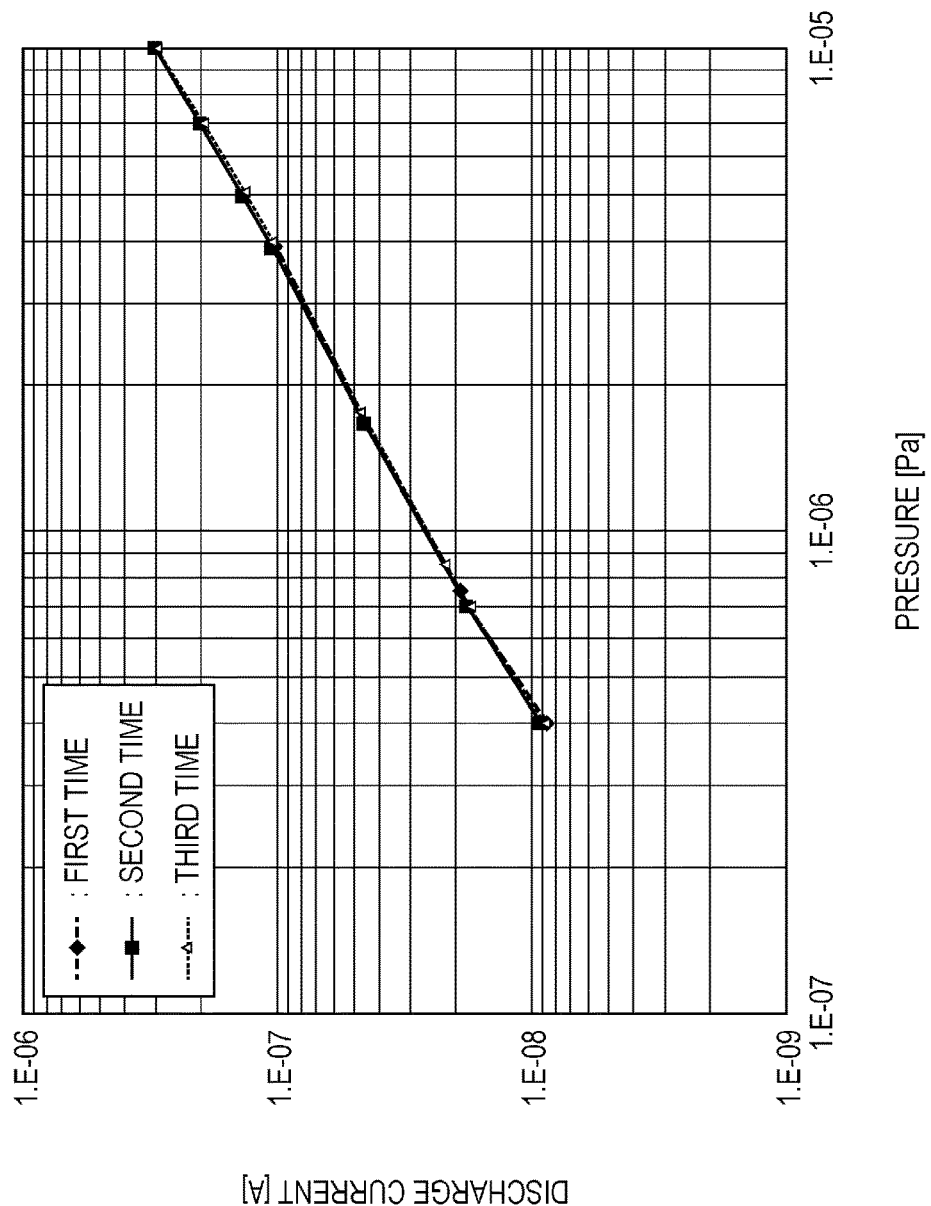
FIG. 6 is a graph for showing the pressure-discharge current characteristics of the cold cathode ionization gauge according to the first embodiment.
Figure 7:
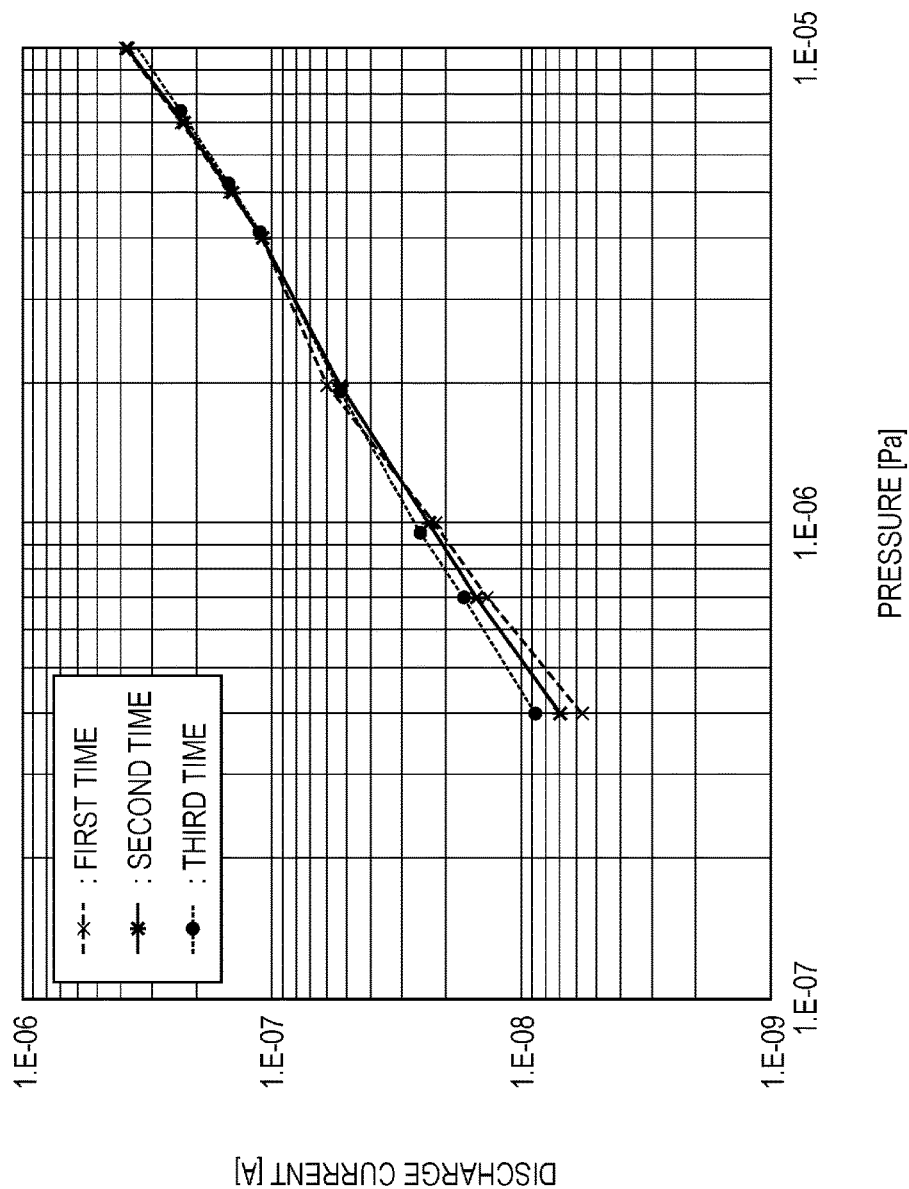
FIG. 7 is a graph for showing the pressure-discharge current characteristics of the cold cathode ionization gauge according to the comparative example.

FIG. 6 is a graph for showing the I-P characteristics of the cold cathode ionization gauge 100 according to the example, namely, the first embodiment. In FIG. 6, results obtained by performing measurement three times are shown. FIG. 7 is a graph for showing the I-P characteristics of the cold cathode ionization gauge 200 according to the comparative example. Also in FIG. 7, results obtained by performing measurement three times are shown. As can be seen in FIG. 7, in the case of the cold cathode ionization gauge 200 according to the comparative example, the I-P characteristics fluctuate. In contrast to this, as can be seen in FIG. 6, in the case of the cold cathode ionization gauge 100 according to the first embodiment, the I-P characteristics hardly fluctuate. From the foregoing, it is found that, according to the first embodiment, the cold cathode ionization gauge 100 having excellent reproducibility may be provided.

Figure 8:
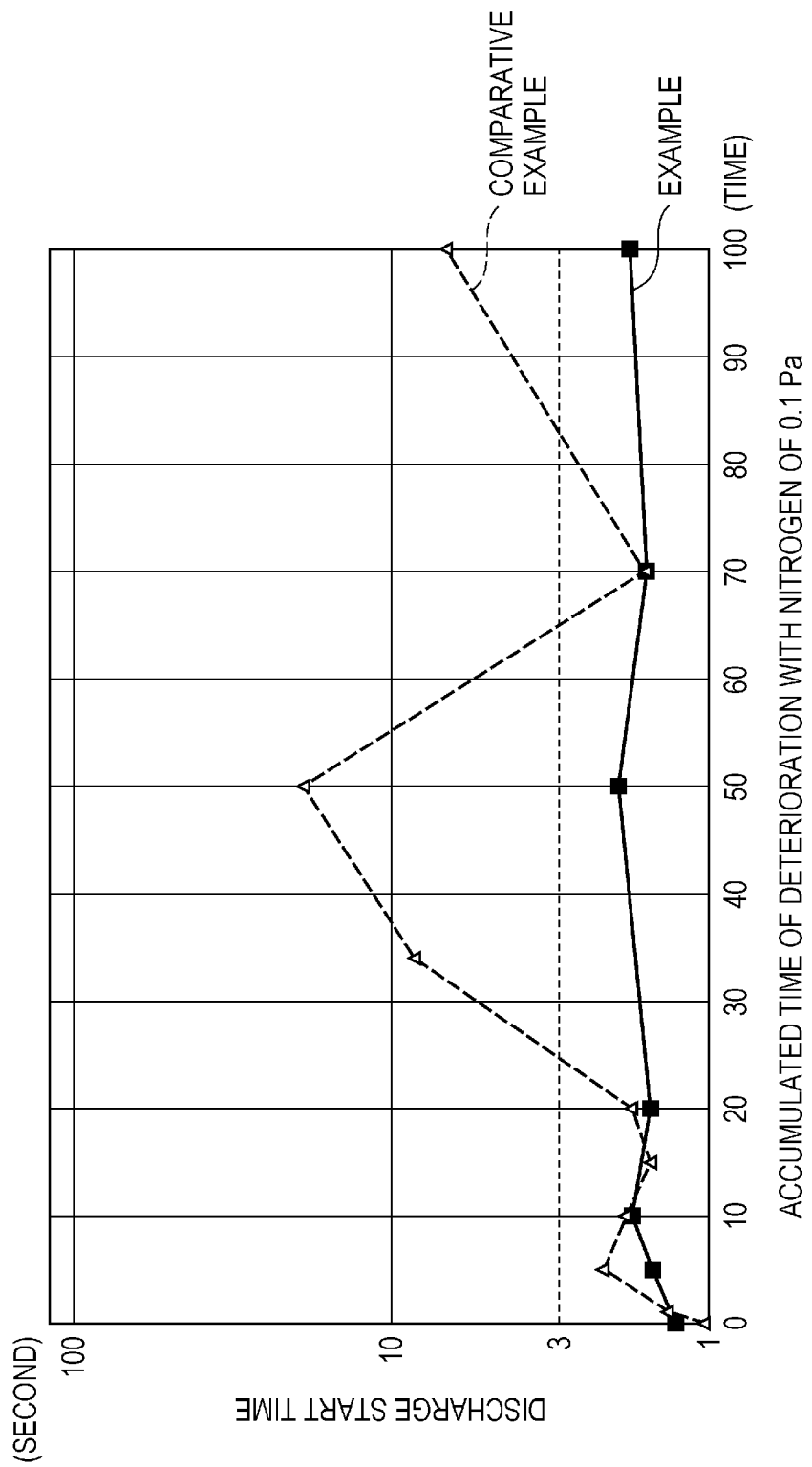
FIG. 8 is a graph for showing discharge start time.

FIG. 8 is a graph for showing the discharge start times of the cold cathode ionization gauge 100 according to the example, namely, the first embodiment and the cold cathode ionization gauge 200 according to the comparative example. The horizontal axis represents accumulated time during which the inside of the gauge head 102 is deteriorated by nitrogen of 0.1 Pa. The vertical axis represents discharge start time. As can be seen in FIG. 8, the discharge start times of the cold cathode ionization gauge 200 according to the comparative example exceeds three seconds, which is a reference for determining whether the discharge start time is acceptable or not, only at a deterioration accumulated time of 25 hours. In contrast to this, according to the first embodiment, the discharge start time falls below three seconds, which is the reference for acceptance determination, even after a deterioration accumulated time of 100 hours. From the foregoing, it is found that, according to the first embodiment, the gauge head 102 having a long life may be achieved. Three seconds, which is the reference for acceptance determination, is a reference set for convenience's sake and is not a general reference for acceptance determination.

As described above, according to the first embodiment, the plate-like body 20 is mounted on the discharge space 4 side of the pole piece 105, and the plate-like body 20 prevents the light source 15 from being directly seen from the discharge space 4. Thus, according to the first embodiment, cathode constituent particles generated through sputtering in the discharge space 4 can be prevented from adhering to the light source 15, and the light source 15 can therefore emit electromagnetic waves for a long period. Further, in the first embodiment, electromagnetic waves emitted from the light source 15 easily reach the wall portion 107. Thus, according to the first embodiment, the cold cathode ionization gauge 100 having short discharge start time and a long life can be provided. Still further, in the first embodiment, the thickness of the center portion of the pole piece 105 is larger than the thickness of the outer peripheral portion of the pole piece 105. In addition, the thickness of the pole piece gradually changes from the outer peripheral portion to the center portion of the pole piece. Thus, according to the first embodiment, the cold cathode ionization gauge 100 capable of achieving stable characteristics over a wide pressure range can be provided. In conclusion, according to the first embodiment, the cold cathode ionization gauge 100 having excellent characteristics can be provided.

Modification Example (Part 1)

Figure 9:
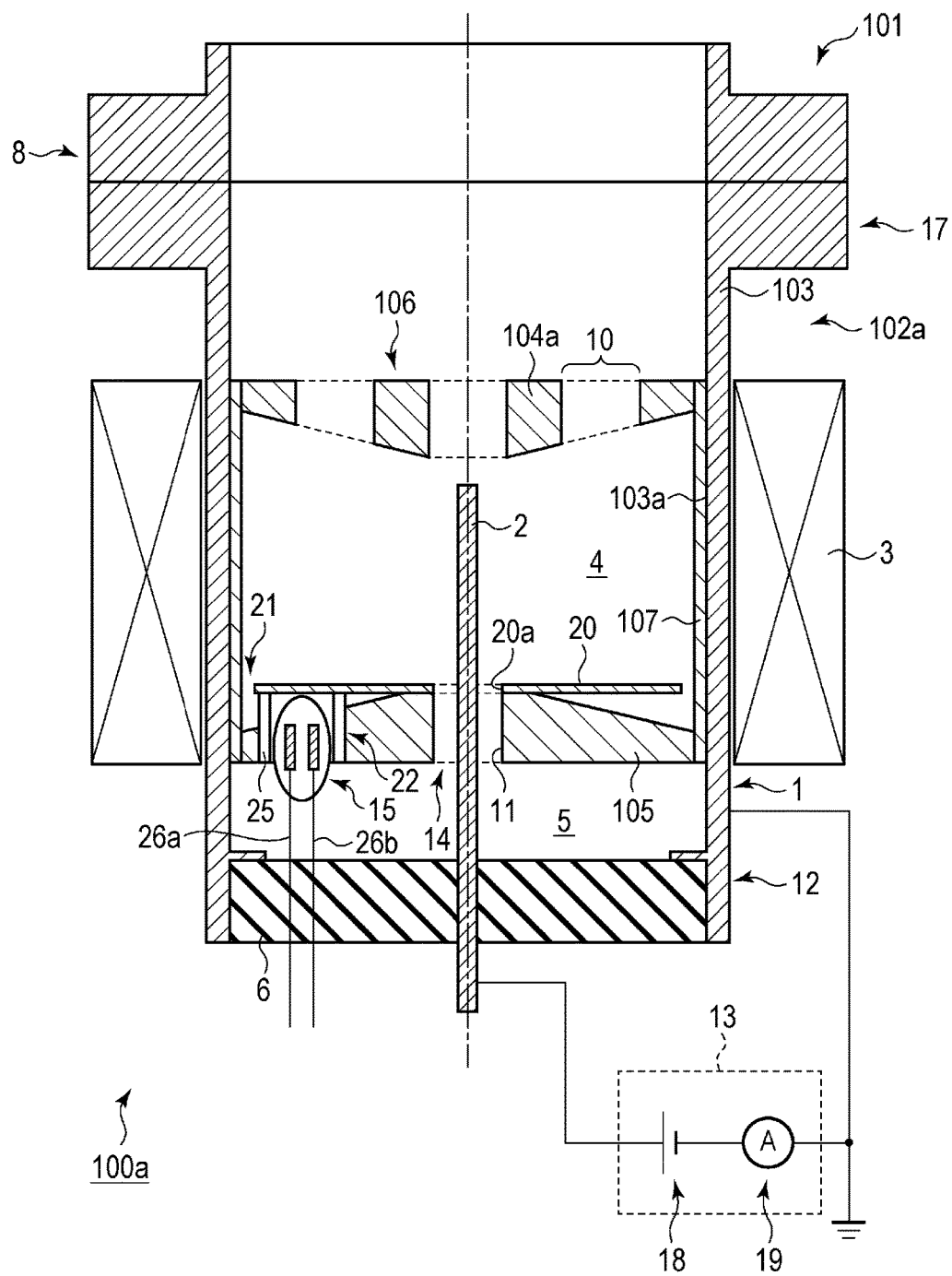
FIG. 9 is a cross-sectional view for illustrating a cold cathode ionization gauge according to a modification example (Part 1) of the first embodiment.

A cold cathode ionization gauge 100a according to a modification example (Part 1) of the first embodiment is described with reference to FIG. 9. FIG. 9 is a cross-sectional view for illustrating the cold cathode ionization gauge 100a according to this modification example.

In the cold cathode ionization gauge 100a according to this modification example, not only the pole piece 105 positioned on the one end portion 12 side of the gauge head container 103, but also a pole piece 104a positioned on the other end portion 17 side of the gauge head container 103 has a thickness that gradually increases from the outer peripheral portion of the pole piece 104a to the center portion thereof. The pole piece 104a has an inclined surface on the discharge space 4 side. According to this modification example, the thickness of the center portion of the pole piece 104a is larger than the thickness of the outer peripheral portion of the pole piece 104a, and hence the magnetic flux density in the center portion of the discharge space 4 can be further increased. As a result, this modification example can further prompt discharging, to thereby contribute to a reduction in discharge start time and the like. In addition, the thickness of the pole piece 104a gradually changes from the outer peripheral portion to the center portion, and hence stable characteristics are obtained. In this way, the thickness of the pole piece 104a may gradually increase from the outer peripheral portion to the center portion.

Modification Example (Part 2)

Figure 10:
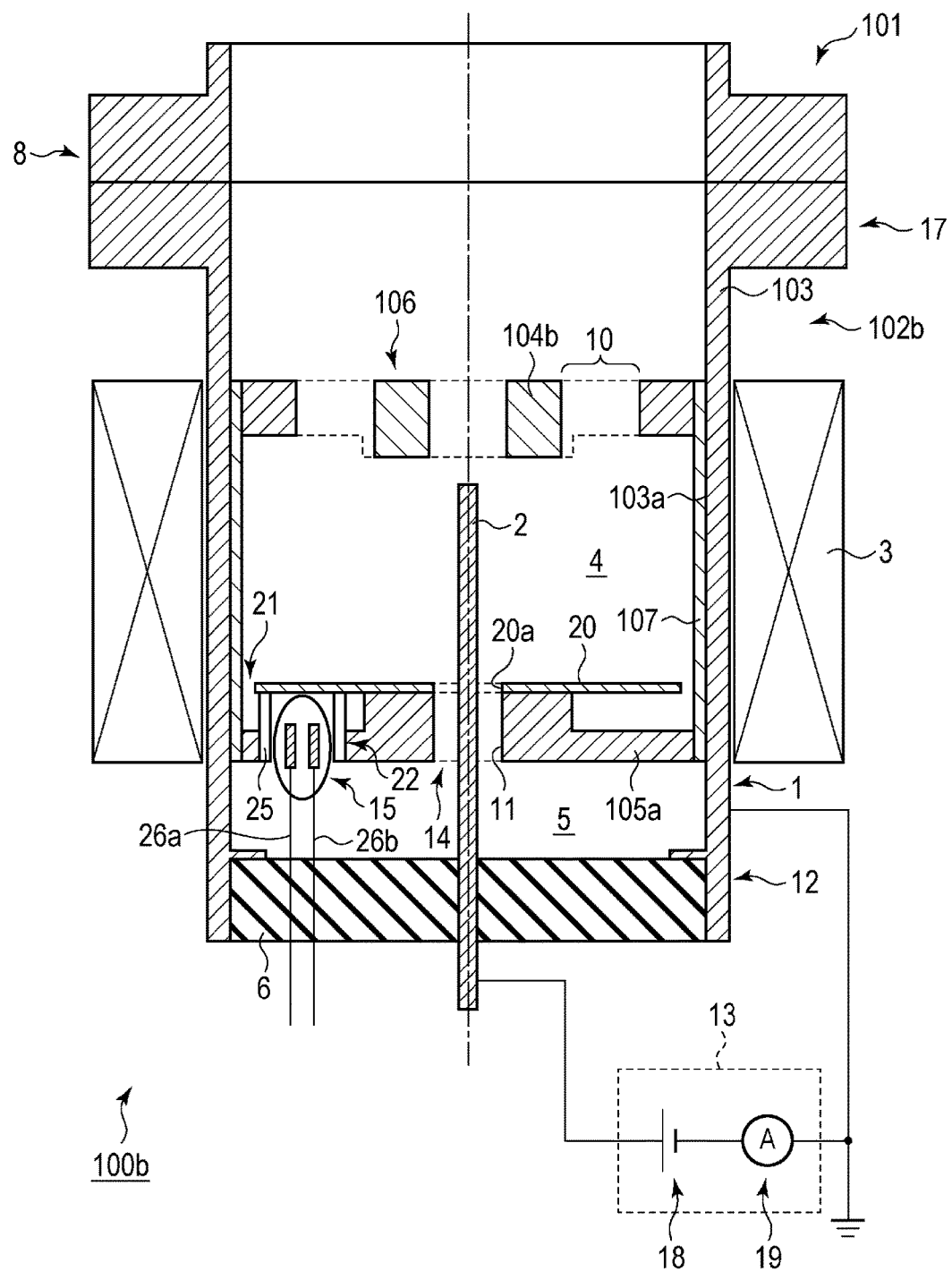
FIG. 10 is a cross-sectional view for illustrating a cold cathode ionization gauge according to a modification example (Part 2) of the first embodiment.

A cold cathode ionization gauge 100b according to a modification example (Part 2) of the first embodiment is described with reference to FIG. 10. FIG. 10 is a cross-sectional view for illustrating the cold cathode ionization gauge 100b according to this modification example.

In the cold cathode ionization gauge 100b according to this modification example, a pole piece 105a positioned on the one end portion 12 side of the gauge head container 103, and a pole piece 104b positioned on the other end portion 17 side of the gauge head container 103 have steps so as to have large thicknesses in center portions thereof. In this way, the pole piece 104b may have a step so as to have a large thickness in the center portion. Also in this modification example, the magnetic flux density in the center portion of the discharge space 4 can be further increased and discharging can be prompted, which can contribute to a reduction in discharge start time and the like.

Second Embodiment

Figure 11:
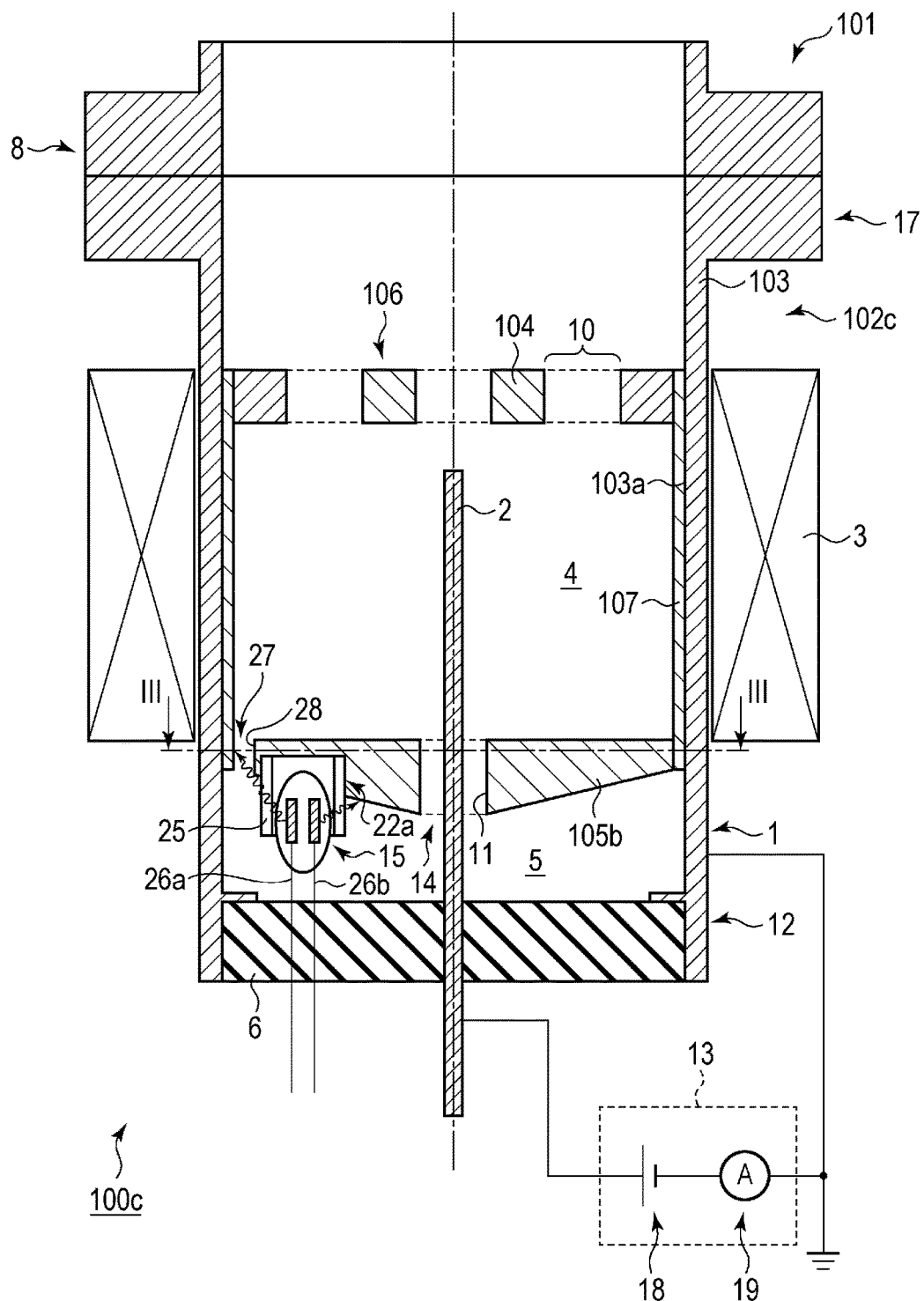
FIG. 11 is a cross-sectional view for illustrating a cold cathode ionization gauge according to a second embodiment of the present invention.

A cold cathode ionization gauge and a cold cathode ionization gauge cartridge according to a second embodiment of the present invention are described with reference to the drawings. FIG. 11 is a cross-sectional view for illustrating the cold cathode ionization gauge according to the second embodiment. The same components as those of the cold cathode ionization gauges according to the first embodiment, which are illustrated in FIG. 1 to FIG. 10, are denoted by the same reference symbols, and description thereof is omitted or simplified.

A cold cathode ionization gauge 100c according to the second embodiment differs from the first embodiment in the shape of a pole piece 105b. Further, the cold cathode ionization gauge 100c according to the second embodiment differs from the first embodiment in arrangement of the light source 15. The cold cathode ionization gauge 100c according to the second embodiment does not include the plate-like body 20.

As illustrated in FIG. 11, a light source arrangement portion 22a is formed on a side of the pole piece 105b that is opposed to the discharge space 4 side. The light source arrangement portion 22a is a hole formed in the pole piece 105b, for example. This hole does not pass through the pole piece 105b. The light source 15 is arranged in the light source arrangement portion 22a. In the second embodiment, the pole piece 105b prevents the light source 15 from being directly seen from the discharge space 4. As in the first embodiment, the light source arrangement portion 22a is positioned near the wall portion 107. This means that the light source 15 is positioned near the wall portion 107. The light source 15 is arranged in the space (second space) 5 that the seal 12 faces.

Figure 12:
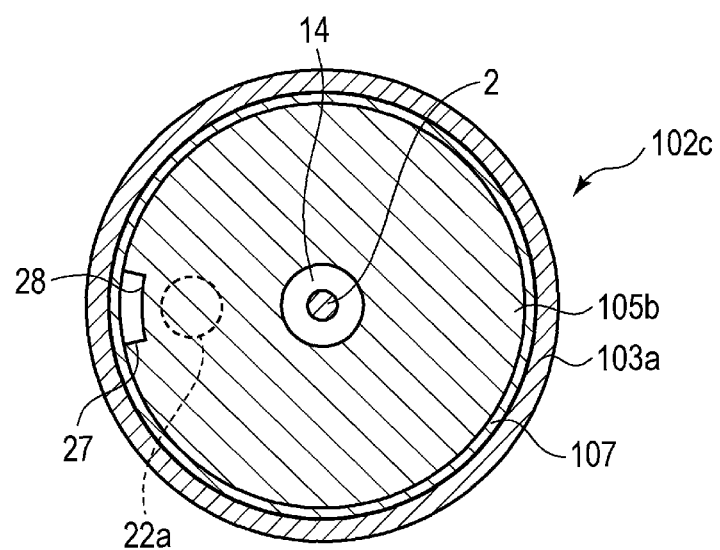
FIG. 12 is a cross-sectional view for illustrating a gauge head of the cold cathode ionization gauge according to the second embodiment.

FIG. 12 is a cross-sectional view for illustrating a gauge head 102c of the cold cathode ionization gauge 100c according to the second embodiment. FIG. 12 corresponds to a cross section taken along the line III-III of FIG. 11. As illustrated in FIG. 12, in the pole piece 105b, an opening 28, namely, a cutout portion is formed. Due to the presence of the opening 28, a gap 27 is formed between at least part of the outer peripheral portion of the pole piece 105b and the wall portion 107. Light beams emitted from the light source 15, namely, electromagnetic waves may be introduced into the discharge space 4 through the gap 27. Electrons emitted from the wall portion 107 may also be introduced into the discharge space 4 through the gap 27.

In the second embodiment, the pole piece 105b positioned on the one end portion 12 side of the gauge head 102c has an inclined surface on a side opposed to the discharge space 4 side. Hence, in the outer peripheral portion of the pole piece 105b, a distance between a surface of the pole piece 105b that is opposed to the discharge space 4 side and the discharge space 4 is small. As a result, according to the second embodiment, electromagnetic waves emitted from the light source 15 can sufficiently reach a portion of the wall portion 107 that is close to the discharge space 4.

The pole piece 105b having the larger thickness in the center portion than in the outer peripheral portion may contribute to an increase in magnetic flux density in the center portion of the discharge space 4, as in the first embodiment. Consequently, also in the second embodiment, discharging can be prompted, which allows a reduction in discharge start time and the like.

In this way, the light source 15 may be arranged on the side of the pole piece 105b that is opposed to the discharge space 4 side. Also in the second embodiment, the light source 15 is prevented from being directly seen from the discharge space 4. Thus, cathode constituent particles generated through sputtering in the discharge space 4 can be prevented from adhering to the light source 15, and the light source 15 can therefore emit electromagnetic waves for a long period.

In addition, in the second embodiment, the surface of the pole piece 104 that is on the discharge space 4 side and the surface of the pole piece 105b that is on the discharge space 4 side are parallel to each other, which means that the discharge space 4 has a vertically and horizontally symmetrical shape. With the discharge space 4 having a simple shape, that is, a shape without unevenness as described above, local abnormal discharge hardly occurs. As a result, according to the second embodiment, fluctuations in measurement values can be further suppressed, and more excellent reproducibility can therefore be achieved.

Modification Example (Part 1)

Figure 13:
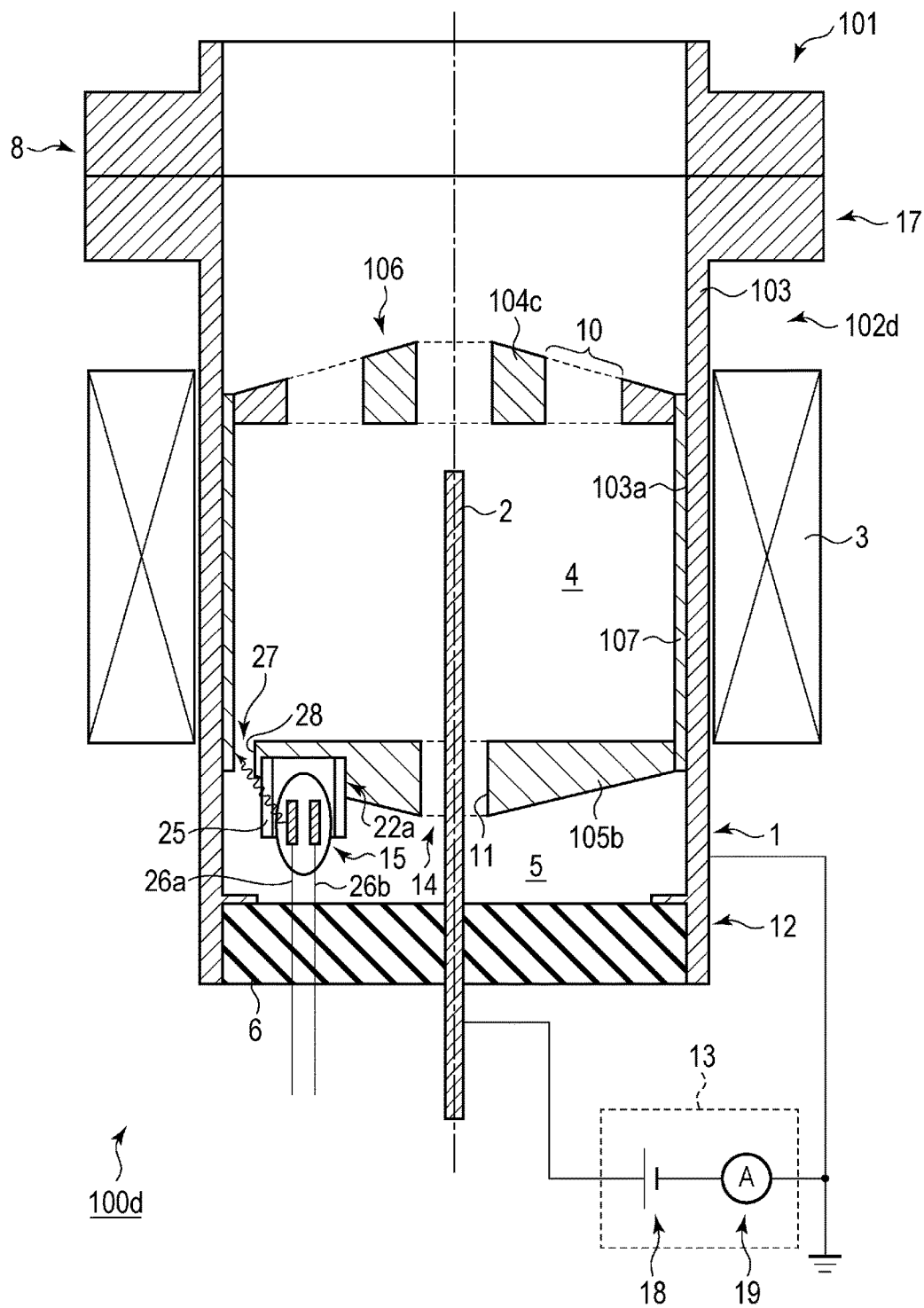
FIG. 13 is a cross-sectional view for illustrating a gauge head of a cold cathode ionization gauge according to a modification example (Part 1) of the second embodiment.

A cold cathode ionization gauge 100d according to a modification example (Part 1) of the second embodiment is described with reference to FIG. 13. FIG. 13 is a cross-sectional view for illustrating a gauge head 102d of the cold cathode ionization gauge 100d according to this modification example.

In the cold cathode ionization gauge 100d according to this modification example, not only the pole piece 105b positioned on the one end portion 12 side of the gauge head container 103, but also a pole piece 104c positioned on the other end portion 17 side of the gauge head container 103 has a thickness that gradually increases from the outer peripheral portion of the pole piece 104c to the center portion thereof. The pole piece 104c has an inclined surface on a side opposed to the discharge space 4 side. According to this modification example, the thickness of the center portion of the pole piece 104c is larger than the thickness of the outer peripheral portion of the pole piece 104c, and hence the magnetic flux density in the center portion of the discharge space 4 can be further increased. As a result, this modification example can further prompt discharging, to thereby contribute to a reduction in discharge start time and the like. In addition, the thickness of the pole piece 104c gradually changes from the outer peripheral portion to the center portion, and hence stable characteristics are obtained. In this way, the thickness of the pole piece 104c may gradually increase from the outer peripheral portion to the center portion.

Modification Example (Part 2)

Figure 14:
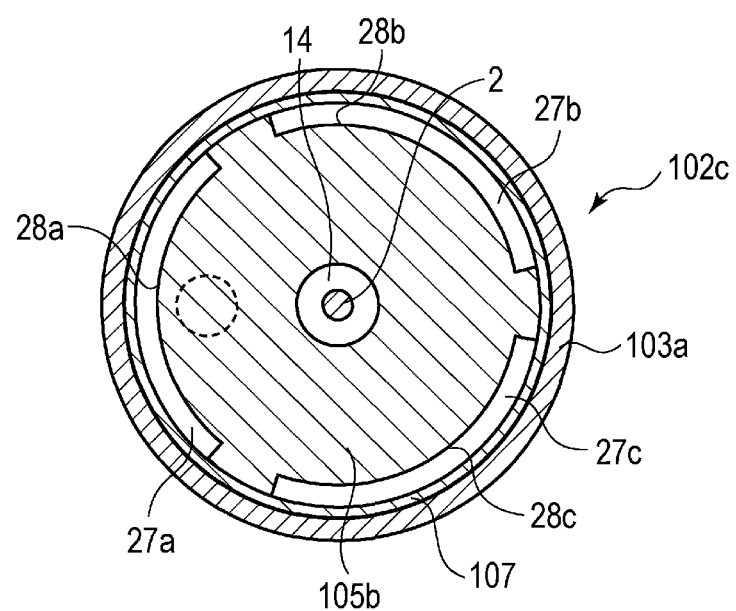
FIG. 14 is a cross-sectional view for illustrating a gauge head of a cold cathode ionization gauge according to a modification example (Part 2) of the second embodiment.

A cold cathode ionization gauge according to a modification example (Part 2) of the second embodiment is described with reference to FIG. 14. FIG. 14 is an illustration of an embodiment that is different from that of FIG. 12. As illustrated in FIG. 14, in the pole piece 105b, openings 28a to 28c, namely, a plurality of cutout portions are formed. Due to the presence of the openings 28a to 28c, gaps 27a to 27c are formed between the pole piece 105b and the wall portion 107. Electromagnetic waves emitted from the light source 15 may be introduced into the discharge space 4 through the gaps 27a to 27c. Electrons emitted from the wall portion 107 may also be introduced into the discharge space 4 through the gaps 27a to 27c. According to this modification example, the gaps 27a to 27c are formed over a wide range, and hence electromagnetic waves emitted from the light source 15, and electrons generated by the photoelectric effect may be introduced into the discharge space 4 more effectively. This modification example can therefore achieve a further reduction in discharge start time and the like, for example.

Modification Embodiment

The present invention is not limited to the above-mentioned embodiments and various modifications can be made thereto.

For example, in the second embodiment, the pole pieces 104c and 105b may have steps formed thereto instead of the inclined surfaces so that the pole pieces 104c and 105b may have larger thicknesses in the center portions than in the outer peripheral portions.

What is claimed is:
1. A cold cathode ionization gauge comprising:
an anode;
a cathode, which has a tubular shape, and is arranged to surround the anode;
a seal for sealing one opening of the cathode;
a first member, which faces the seal inside the cathode, and has a through hole formed therein;
a partition for dividing a space surrounded by the cathode, the seal, and the first member into a first space that the first member faces and a second space that the seal faces, where the partition is arranged between the first space and the second space; and
a light source, which is arranged in the partition or the second space, and is configured to emit an electromagnetic wave,
wherein a gap is formed between at least part of an outer peripheral portion of the partition and the cathode.

2. The cold cathode ionization gauge according to claim 1, wherein the partition comprises a second member, and a third member arranged on the first space side of the second member, and
wherein at least part of the light source is located between the second member and the third member.

3. The cold cathode ionization gauge according to claim 2, wherein a distance between the second member and the third member in an outer peripheral portion of the second member is larger than a distance between the second member and the third member in a center portion of the second member.

4. The cold cathode ionization gauge according to claim 2, wherein the gap is formed between at least part of an outer peripheral portion of the third member and the cathode.

5. The cold cathode ionization gauge according to claim 1, wherein the partition comprises a second member, and at least part of the light source is located in the second space.

6. The cold cathode ionization gauge according to claim 2, wherein a thickness of a center portion of the second member is larger than a thickness of an outer peripheral portion of the second member.

7. The cold cathode ionization gauge according to claim 6, wherein a thickness of the second member continuously changes from the outer peripheral portion of the second member to the center portion of the second member.

8. The cold cathode ionization gauge according to claim 1, wherein a distance between the light source and the cathode is shorter than a distance between the light source and the anode.

9. The cold cathode ionization gauge according to claim 2, wherein the first member and the second member comprise a magnetic material.

10. The cold cathode ionization gauge according to claim 2, wherein the third member is made of a non-magnetic material.

11. The cold cathode ionization gauge according to claim 1, further comprising a cover for covering at least part of the light source.

12. The cold cathode ionization gauge according to claim 11, wherein the cover has a metal film formed thereon.

13. The cold cathode ionization gauge according to claim 1, wherein a surface of the light source has a metal film formed thereon.

14. A cold cathode ionization gauge cartridge, which is removably arranged inside a cathode of a cold cathode ionization gauge, the cold cathode ionization gauge comprising:
  an anode;
  the cathode, which has a tubular shape, and is arranged to surround the anode; and
  a seal for sealing one opening of the cathode, the cold cathode ionization gauge cartridge comprising:
    a first member, which faces the seal, and has a through hole formed therein;
    a partition for dividing a space surrounded by the cathode, the seal, and the first member into a first space that the first member faces and a second space that the seal faces, where the partition is arranged between the first space and the second space; and
    a connection portion, which has a tubular shape, is connected to the first member and is connected to the partition,
  wherein a gap is formed between the connection portion and the partition.

15. The cold cathode ionization gauge cartridge according to claim 14, further comprising a light source cover arranged in the partition.

16. A cold cathode ionization gauge comprising:
  an anode;
  a cathode, which has a tubular shape, and is arranged to surround the anode;
  a first magnetic member, which has a disc shape and a through hole through which the anode passes, and is arranged inside the cathode; and
  a second magnetic member, which has a disc shape, and is arranged to face the first magnetic member inside the cathode,
  wherein at least one of the first magnetic member or the second magnetic member has a larger thickness at a center portion thereof than at an outer peripheral portion thereof.

17. A cold cathode ionization gauge cartridge, which is removably arranged inside a cathode of a cold cathode ionization gauge, the cold cathode ionization gauge comprising:
  an anode; and
  the cathode, which has a tubular shape, and is arranged to surround the anode, the cold cathode ionization gauge cartridge comprising:
    a first magnetic member, which has a disc shape and a through hole through which the anode passes, and is arranged inside the cathode; and
    a second magnetic member, which has a disc shape, and is arranged to face the first magnetic member inside the cathode,
  wherein at least one of the first magnetic member or the second magnetic member has a larger thickness at a center portion thereof than at an outer peripheral portion thereof.

* * * * *